United States Patent
Lahnala (10) Patent No.: US 9,211,780 B2
(45) Date of Patent: Dec. 15, 2015

(54) VERTICAL SLIDING WINDOW ASSEMBLY FOR A VEHICLE

(71) Applicants: AGC Automotive Americas R&D, Ypsilanti, MI (US); AGC Flat Glass North America, Inc., Alpharetta, GA (US)

(72) Inventor: David W. Lahnala, Adrian, MI (US)

(73) Assignee: AGC AUTOMOTIVE AMERICAS R&D, INC., Alpharetta, GA (US)

( * ) Notice: Subject to any disclaimer, the term of this patent is extended or adjusted under 35 U.S.C. 154(b) by 0 days.

(21) Appl. No.: 14/377,992

(22) PCT Filed: Feb. 13, 2013

(86) PCT No.: PCT/US2013/025939
§ 371 (c)(1),
(2) Date: Aug. 11, 2014

(87) PCT Pub. No.: WO2013/123050
PCT Pub. Date: Aug. 22, 2013

(65) Prior Publication Data
US 2015/0042127 A1 Feb. 12, 2015

Related U.S. Application Data

(60) Provisional application No. 61/598,110, filed on Feb. 13, 2012.

(51) Int. Cl.
*B60J 7/00* (2006.01)
*B60J 1/18* (2006.01)
(Continued)

(52) U.S. Cl.
CPC ............... *B60J 1/1861* (2013.01); *B60J 1/006* (2013.01); *B60J 10/0062* (2013.01); *B60J 10/02* (2013.01); *B60J 10/042* (2013.01); *E06B 3/4407* (2013.01); *E06B 3/4423* (2013.01)

(58) Field of Classification Search
CPC ....... B60J 1/1853; F16M 11/10; F16M 11/04; F16M 11/24; E05Y 2900/55; E05Y 2900/148; Y10S 292/46; E05B 65/0888; H01H 2300/01
USPC ............ 296/190.1, 146.16, 190.11, 200, 201, 296/223; 292/DIG. 46; 52/207, 202; 49/404, 49/413, 130, 360, 63; 160/90
See application file for complete search history.

(56) References Cited

U.S. PATENT DOCUMENTS 4,015,875 A * 4/1977 Setina ........................ 296/24.46
4,119,341 A * 10/1978 Cook ........................ 296/146.16
(Continued)

OTHER PUBLICATIONS

International Search Report for Application No. PCT/US2013/025939 dated Apr. 11, 2013, 2 pages.

*Primary Examiner* — Kiran B Patel
(74) *Attorney, Agent, or Firm* — Howard & Howard Attorneys PLLC (57) ABSTRACT

A vertical sliding window assembly can be coupled to a vehicle. The vertical sliding window assembly includes first and second fixed panels adapted to be fixed to the vehicle. The fixed panels each have a top edge and a bottom edge spaced from each other. A top cross-member is coupled to the first and second fixed panels adjacent the top edge. A bottom cross-member is spaced from the top cross-member and is coupled to the first and second fixed panels adjacent the bottom edge. A sliding panel has an interior surface and an exterior surface opposite the interior surface and is movable relative to the fixed panels. The top cross-member is disposed adjacent the exterior surface of the sliding panel and the bottom cross-member is disposed adjacent the interior surface of the sliding panel such that the exterior surface of the sliding panel is unobstructed by the bottom cross-member.

10 Claims, 8 Drawing Sheets

(51) Int. Cl.
*B60J 10/00* (2006.01)
*B60J 10/04* (2006.01)
*B60J 1/00* (2006.01)
*B60J 10/02* (2006.01)
*E06B 3/44* (2006.01)

(56) References Cited

U.S. PATENT DOCUMENTS

| | | | |
|---|---|---|---|
| 4,671,013 A * | 6/1987 | Friese et al. | 49/380 |
| 5,395,153 A | 3/1995 | De Smet | |
| 5,722,108 A | 3/1998 | Sakyo et al. | |
| 6,125,587 A * | 10/2000 | Woods | 49/374 |
| 6,223,470 B1 * | 5/2001 | Millard et al. | 49/374 |
| 6,260,905 B1 * | 7/2001 | Wagner | 296/146.16 |
| 6,422,638 B1 | 7/2002 | Carnaghi et al. | |
| 6,439,641 B1 | 8/2002 | Anders et al. | |
| 6,691,464 B2 | 2/2004 | Nestell et al. | |
| 6,766,617 B2 | 7/2004 | Purcell | |
| 7,437,852 B2 | 10/2008 | Dufour et al. | |
| 7,581,775 B2 | 9/2009 | Lekar | |
| 7,703,836 B2 | 4/2010 | Snider et al. | |
| 7,707,779 B2 | 5/2010 | Petta et al. | |
| 7,871,138 B2 | 1/2011 | Anikhindi et al. | |
| 7,882,657 B2 | 2/2011 | Duncan et al. | |
| 7,905,542 B2 | 3/2011 | Marx et al. | |
| 8,246,101 B2 * | 8/2012 | Cicala | 296/146.16 |
| 2002/0003356 A1 | 1/2002 | Davis et al. | |
| 2003/0182865 A1 * | 10/2003 | Nestell et al. | 49/374 |
| 2003/0213179 A1 * | 11/2003 | Galer | 49/413 |
| 2005/0044799 A1 * | 3/2005 | Kinross et al. | 49/413 |
| 2005/0121942 A1 | 6/2005 | Repp et al. | |
| 2005/0150170 A1 * | 7/2005 | Lahnala | 49/413 |
| 2005/0150171 A1 * | 7/2005 | Lahnala | 49/413 |
| 2005/0184557 A1 * | 8/2005 | Suzuki | 296/146.16 |
| 2006/0137253 A1 | 6/2006 | Kotte et al. | |
| 2007/0017159 A1 | 1/2007 | Moore | |
| 2007/0151159 A1 | 7/2007 | Arimoto | |
| 2007/0277442 A1 | 12/2007 | Dery et al. | |
| 2008/0216410 A1 | 9/2008 | Lahnala | |
| 2009/0038229 A1 | 2/2009 | Cicala et al. | |
| 2009/0151263 A1 | 6/2009 | Lindborg et al. | |
| 2009/0241426 A1 * | 10/2009 | Seiple et al. | 49/374 |
| 2010/0122495 A1 * | 5/2010 | Lahnala | 49/358 |
| 2012/0007483 A1 | 1/2012 | Wishlade | |
| 2012/0139289 A1 * | 6/2012 | Lahnala | 296/146.16 |
| 2014/0230333 A1 * | 8/2014 | Lahnala | 49/408 |
| 2015/0028622 A1 * | 1/2015 | Lahnala | 296/146.16 |

* cited by examiner

VERTICAL SLIDING WINDOW ASSEMBLY FOR A VEHICLE

CROSS-REFERENCE TO RELATED APPLICATIONS

This application is the National Stage of International Patent Application No. PCT/US2013/025939, filed on Feb. 13, 2013, which claims priority to and all advantages of U.S. Provisional Patent Application Ser. No. 61/598,110, which was filed on Feb. 13, 2012, the content of which is incorporated herein by reference.

BACKGROUND OF THE INVENTION

1. Field of the Invention

The invention generally relates to a sliding window assembly. More specifically, the invention relates to a vertical siding window assembly for a vehicle.

2. Description of the Related Art

Sliding window assemblies for vehicles are known in the art and have been widely used by vehicle manufacturers. A conventional vertical sliding window assembly include at least one fixed panel and a sliding panel moveable relative to the fixed panel. The sliding panel moves vertically relative to the fixed panel. As such, as the sliding panel moves from an open position to a closed position, the sliding panel enters a pocket defined by sheet metal within a passenger compartment. Additionally, a lift assembly is also housed within the pocket for moving the sliding panel between the open and closed positions. Because the lift assembly is housed within the pocket, the lift assembly is not visible from the passenger compartment, which is desirable. However, including the lift assembly within the pocket requires the pocket to be thicker and protrude into the passenger compartment where space is limited. Therefore, it would be advantageous to improve the conventional sliding window assemblies.

SUMMARY OF THE INVENTION AND ADVANTAGES

A vertical sliding window assembly can be coupled to a vehicle. The vertical sliding window assembly includes a first fixed panel adapted to be fixed to the vehicle. The first fixed panel has a top edge and a bottom edge spaced from each other. A second fixed panel is adapted to be fixed to the vehicle and is spaced from the first fixed panel to define an opening therebetween. The second fixed panel has a top edge and a bottom edge spaced from each other. A top cross-member is coupled to the first and second fixed panels adjacent the top edge of the first and second fixed panels with the top cross-member spanning the opening. A bottom cross-member is spaced from the top cross-member and is coupled to the first and second fixed panels adjacent the bottom edge of the first and second fixed panels with the bottom cross-member spanning the opening. A sliding panel has an interior surface and an exterior surface opposite the interior surface with the sliding panel movable relative to the fixed panels between a closed position and an open position such that a size of the opening can be modified. The top cross-member is disposed adjacent the exterior surface of the sliding panel and the bottom cross-member is disposed adjacent the interior surface of the sliding panel such that the exterior surface of the sliding panel is unobstructed by the bottom cross-member. Having the sliding panel unobstructed by the bottom cross-member provides a more aesthetically pleasing appearance.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
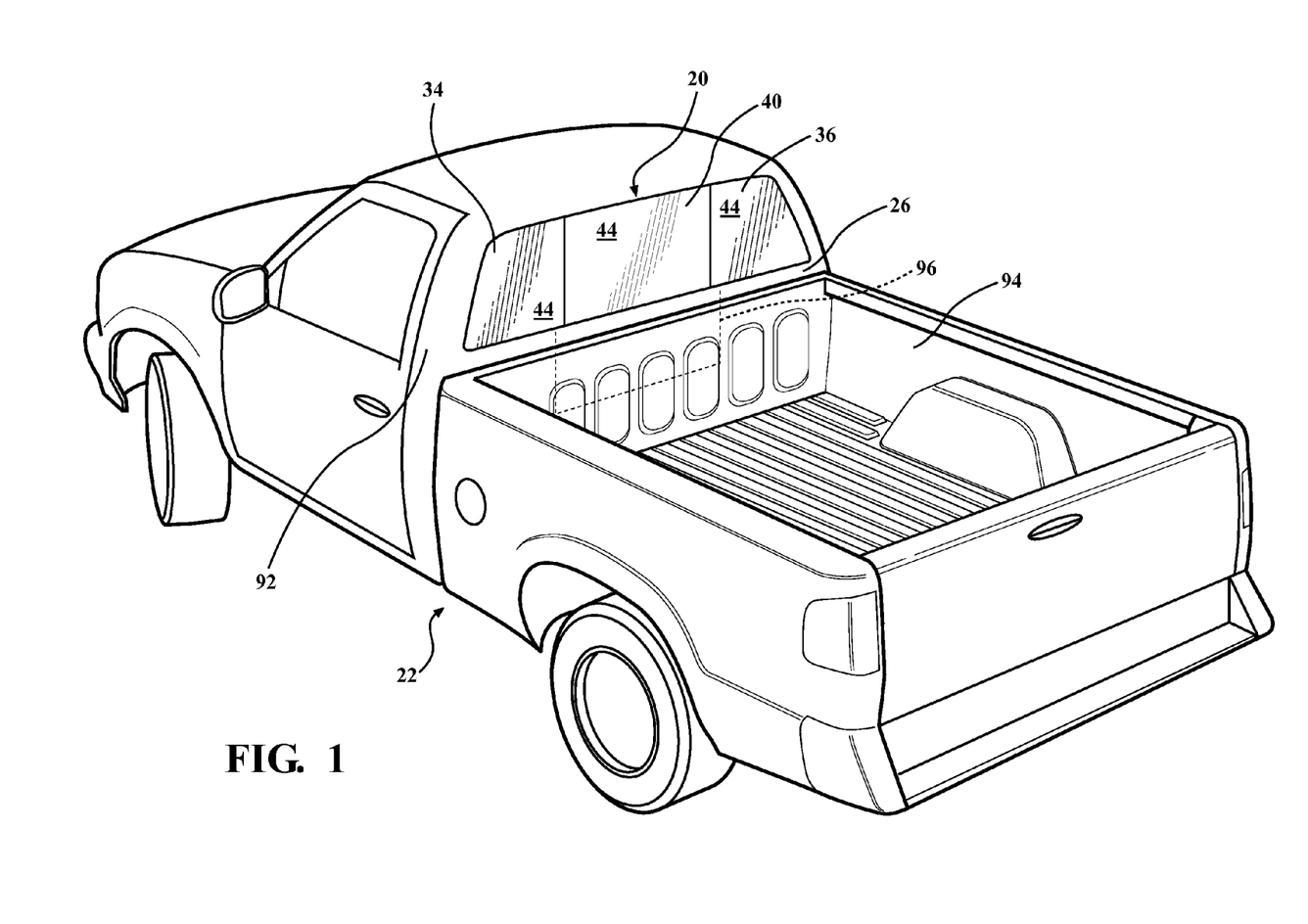
FIG. 1 is a perspective view of a vertical sliding window assembly coupled to a vehicle.

With reference to the Figures, wherein like numerals indicate corresponding parts throughout the several views, a vertical sliding window assembly 20 for a vehicle 22 is generally shown. Referring to FIG. 1, typically, the vertical sliding window assembly 20 is coupled to a rear window body or flange 24 (best shown in FIG. 13) of a pickup truck. However, it is to be appreciated that the vertical sliding window assembly 20 can be implemented in other types of vehicles, as well as in non-vehicle applications.

Figure 13:
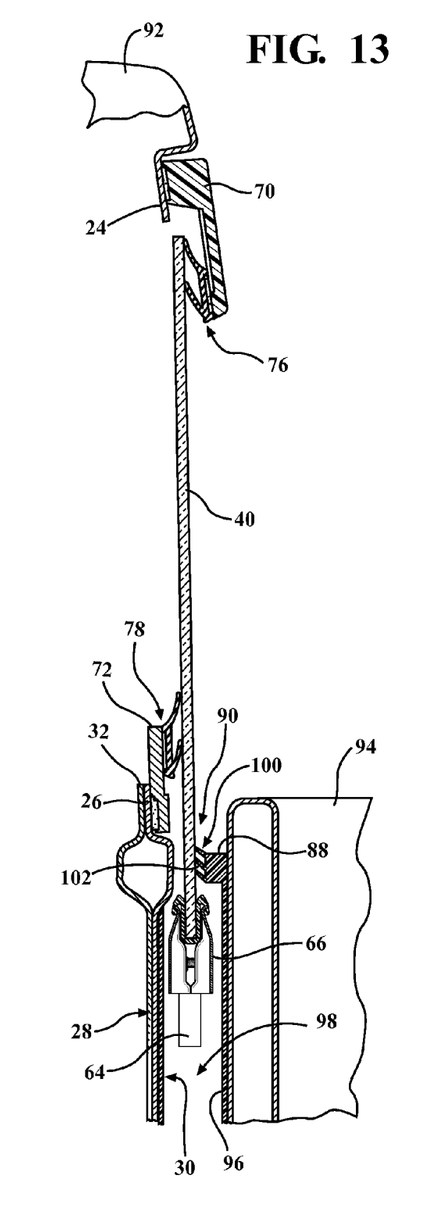
FIG. 13 is a side view of the vertical sliding window assembly coupled to the vehicle as viewed from the exterior of the vehicle.
Figure 14:
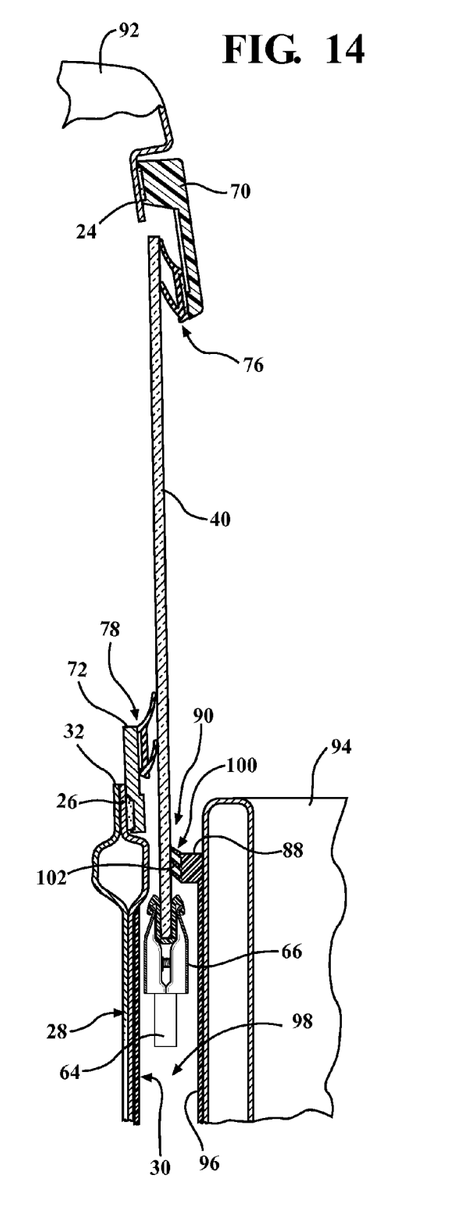
FIG. 14 is a side view of the vertical sliding window assembly coupled to the vehicle as viewed from the exterior of the vehicle showing the casing.

With reference to FIGS. 13 and 14, the vehicle 22 includes a first wall 26 having an inner surface 28 facing an interior of the vehicle 22 and an outer surface 30 opposite the inner surface 28 and facing an exterior of the vehicle 22. The flange 24 extends from the first wall 26 of the vehicle 22 and defines a vehicle opening 32 for receiving the vertical sliding window assembly 20. In one embodiment, the flange 24 integrally extends from the first wall 26. Said differently, the flange 24 is part of the first wall 26.

With reference to FIGS. 1-4, the vertical sliding window assembly 20 includes a first fixed panel 34 adapted to be fixed to the vehicle 22. The vertical sliding window assembly 20 also includes a second fixed panel 36 adapted to be fixed to the vehicle 22. The second fixed panel 36 is spaced from the first fixed panel 34 to define an opening 38 therebetween. The first and second fixed panels 34, 36 each have a top edge T and a bottom edge B spaced from each other. The first and second fixed panels 34, 36 also have a periphery P. The first and second fixed panels 34, 36 are coupled to the flange 24 of the vehicle 22. Typically, the first and second fixed panels 34, 36 are coupled to the flange 24 about the periphery P of the first and second fixed panels 34, 36.

The vertical sliding window assembly 20 further includes a sliding panel 40 movably coupled to the vehicle 22 between an open position and a closed position. As such, the sliding panel 40 is moveable relative to the first and second fixed panels 34, 36 between the open and closed position. Moving the sliding panel 40 between the open and closed positions modifies a size of the opening 38. Generally, the sliding panel 40 moves vertically, up and down, relative to the first and second fixed panels 34, 36. The sliding panel 40 covers the opening 38 when in the closed position as shown in FIGS. 1, 2, 4, and 7 and the sliding panel 40 uncovers the opening 38 when in the open position. It is to be appreciated that the sliding panel 40 is in the open position when the sliding panel 40 is partially covering the opening 38. In other words, the sliding panel 40 is in the open position when the sliding panel 40 is completely or partially uncovering the opening 38. As such, the sliding panel 40 is in the closed position when the sliding panel 40 completely covers the opening 38. It is to be appreciated that a plurality of sliding panel 40s can be utilized.

The first and second fixed panels 34, 36 as well as the sliding panel 40 are typically formed of glass. It is to be appreciated that the first and/or second fixed panels 34, 36 and/or the sliding panel 40 can be formed of any suitable material(s) such as plastic, metal, etc. Further, it is to be appreciated that optionally heating grids can be coupled to each of the first and second fixed panels 34, 36, as well as the sliding panel 40, for defrosting the panels.

The first and second fixed panels 34, 36 and the sliding panel 40 each have an interior surface 42 facing the interior of the vehicle 22 when the vertical sliding window assembly 20 is coupled to the vehicle 22. In addition, the first and second fixed panels 34, 36 and the sliding panel 40 each have an exterior surface 44 opposite the interior surface 42 such that the exterior surface 44 face the exterior of the vehicle 22 when the vertical sliding window assembly 20 is coupled to the vehicle 22. It is to be appreciated that optionally, an appliqué can be disposed between the first and second fixed panels 34, 36 adjacent the exterior surface 44 of the first and second fixed panels 34, 36 for aesthetic purposes.

Figure 4:
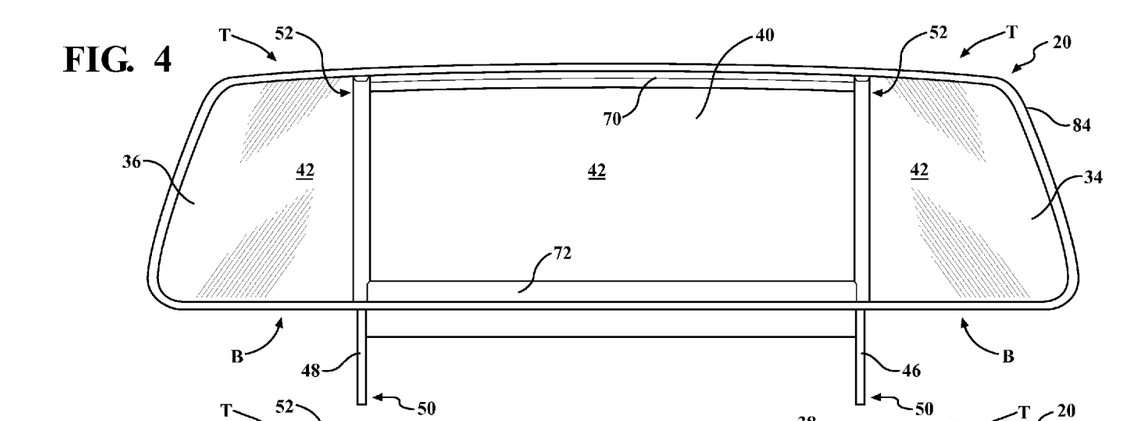
FIG. 4 is a plan view of an interior of the vertical sliding window assembly.
Figure 5:
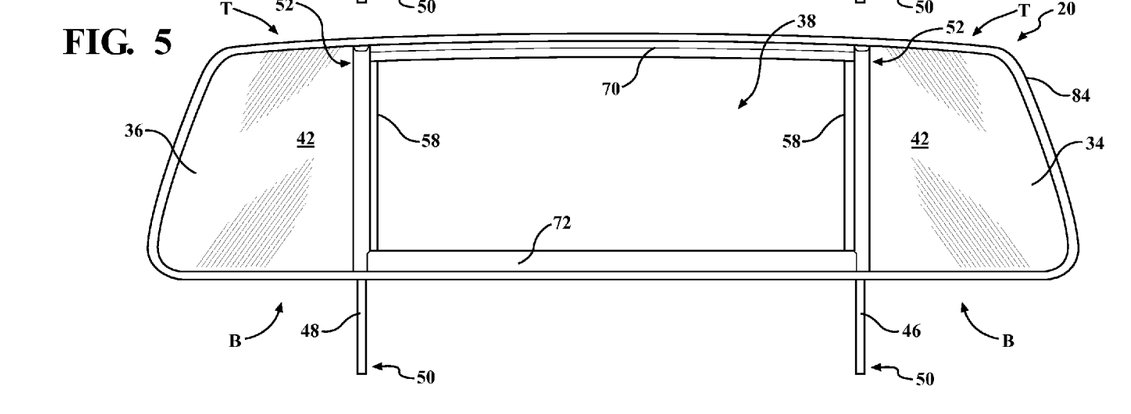
FIG. 5 is a plan view of the interior of the vertical sliding window assembly with the sliding panel removed.
Figure 6:
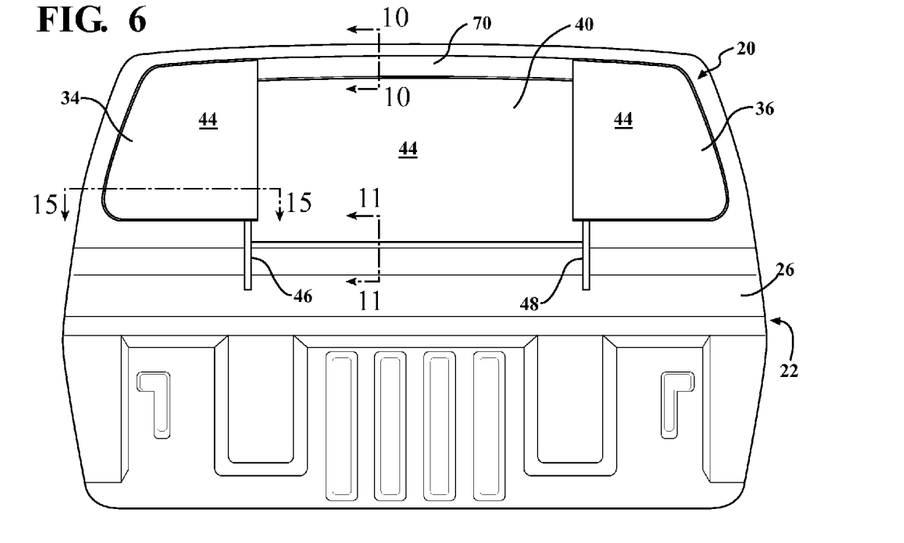
FIG. 6 is a plan view of the vertical sliding window assembly coupled to the vehicle as viewed from an exterior of the vehicle.
Figure 7:
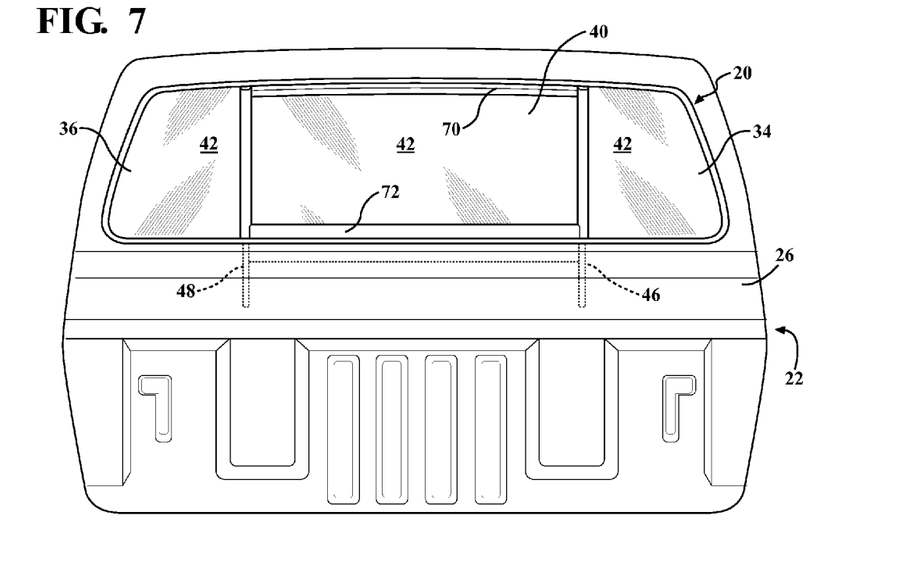
FIG. 7 is a plan view of the vertical sliding window assembly coupled to the vehicle as viewed from a passenger compartment of the vehicle.

The vertical sliding window assembly 20 may include a first vertical track 46 and a second vertical track 48 spaced from each other. It is to be appreciated that the first and second vertical tracks 46, 48 are commonly referred to as vertical pillar vertical tracks 46, 48. Typically, the first and second vertical tracks 46, 48 are disposed vertically on the fixed panels 34, 36 in a substantially spaced and parallel relationship to each other. More typically, the first vertical track 46 is coupled to and extends between the top and bottom edges T, B of the first fixed panel 34. The second vertical track 48 is coupled to and extends between the top and bottom edges T, B of the second fixed panel 36. The vertical tracks 46, 48 run vertically along the fixed panels 34, 36 and are generally parallel to one another. For example, as best shown in FIGS. 4 and 5, the first vertical track 46 is disposed along the interior surface 42 of the first fixed panel 34 and the second vertical track 48 is disposed along the interior surface 42 of the second fixed panel 36 such that the first and second vertical tracks 46, 48 are disposed adjacent the opening 38.

The first and second vertical tracks 46, 48 each define a bottom end 50 and a top end 52 spaced from each other. The bottom end 50 of the first vertical track 46 is adjacent the bottom edge B of the first fixed panel 34 and the top end 52 of the first vertical track 46 is adjacent the top edge T of the first fixed panel 34. Similarly, the bottom end 50 of the second vertical track 48 is adjacent the bottom edge B of the second fixed panel 36 and the top end 52 of the second vertical track 48 is adjacent the top edge T of the second fixed panel 36.

Figure 8:
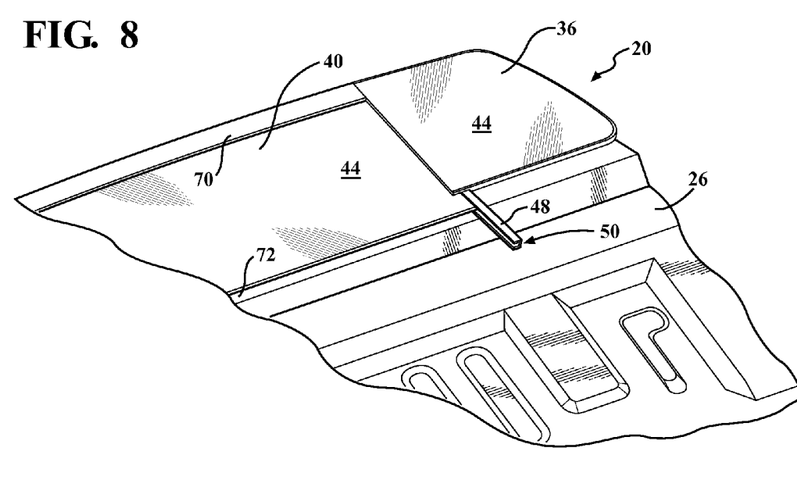
FIG. 8 is a perspective view of the vertical sliding window assembly coupled to a modified flange of the vehicle as viewed from the exterior of the vehicle.

As best shown in FIG. 8, the bottom end 50 of the first and second vertical tracks 46, 48 is open such that the sliding panel 40 can be inserted into the first and second vertical tracks 46, 48. In other words, the sliding panel 40 is inserted into the first and second vertical tracks 46, 48 through the bottom end 50 of the first and second vertical tracks 46, 48 during assembly. As such, after assembly, when the sliding panel 40 is in the open position, a portion of the sliding panel 40 is disposed below the fixed panels 34, 36 and adjacent the flange 24 of the vehicle 22. In other words, when the sliding panel 40 is in the open position, a portion of the sliding panel 40 is disposed below the bottom end 50 of the first and second vertical tracks 46, 48.

Figure 15:
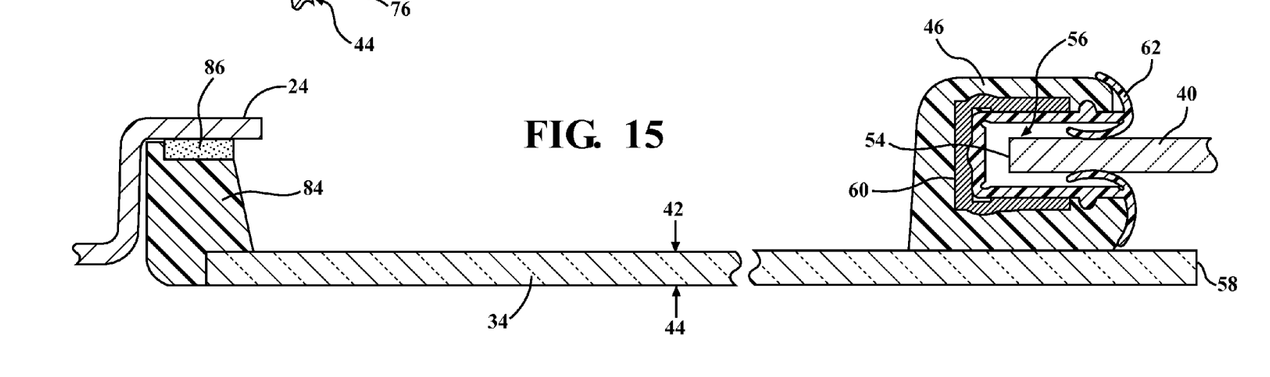
FIG. 15 is a cross-sectional view of a portion of the vertical sliding window assembly taken along line 15-15 in FIG. 6.

The vertical tracks 46, 48 are coupled to the fixed panels 34, 36 for guiding the sliding panel 40 between the open and closed positions. As such, the sliding panel 40 is movably coupled to the vertical sliding window assembly 20 by the first and second vertical tracks 46, 48. As best shown in FIG. 15, generally, each of the vertical tracks 46, 48 guides an edge 54 of the sliding panel 40 as the sliding panel 40 moves between the open and closed positions. For example, each of the vertical tracks 46, 48 may define a guide channel 56 with the edges 54 of the sliding panel 40 disposed within a respective one of the guide channels 56. The edge 54 of the sliding panel 40 move along the guide channel 56 as the sliding panel 40 moved between the open and closed positions. An insert may be disposed in the guide channel 56 of the track for reducing friction between the sliding panel 40 and the vertical tracks 46, 48 as the sliding panel 40 moves between the open and closed positions. It is to be appreciated that the insert may remain stationary as the sliding panel 40 moves between the open and closed positions or the insert may move with the sliding panel 40.

Figure 9:
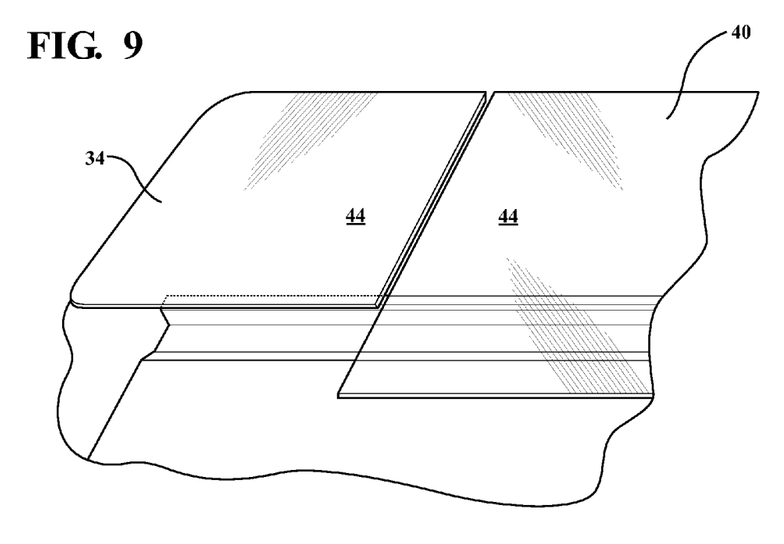
FIG. 9 is a perspective view showing a portion of the vertical sliding window assembly with the sliding panel flush with a fixed panel.

It is to be appreciated that, as shown in FIGS. 4 and 5, the vertical tracks 46, 48 may be disposed on an interior surface 42 of the fixed panels 34, 36. In such an embodiment, the sliding panel 40 is recessed relative to the fixed panels 34, 36. Said differently, the sliding panel 40 is laterally spaced from the fixed panels 34, 36, as is best shown in FIG. 15. As such, the sliding panel 40 may span the opening 38 to overlap the fixed panels 34, 36. It is also to be appreciated that the vertical tracks 46, 48 may be coupled to an edge 58 of the fixed panels 34, 36 such that the vertical tracks 46, 48 are inline with the fixed panels 34, 36. As such, the sliding panel 40 can be flush with the fixed panels 34, 36, as shown in FIG. 9. In such an embodiment, the sliding panel 40 does not span the opening 38. Rather, the sliding panel 40 and the vertical tracks 46, 48 occupying the opening 38 between the fixed panels 34, 36. Said differently, when the vertical tracks 46, 48 are coupled to the edge 54 of the fixed panel, the vertical tracks 46, 48 define the opening 38 that is covered by the sliding panel 40.

With reference to FIG. 15, the vertical sliding window assembly 20 may include a rail 60 disposed in each of the first and second vertical tracks 46, 48. The rail 60 defines the guide channel 56 which is exposed to the interior of the vehicle 22. The rail 60 supports the sliding panel 40 and specifically, the guide channel 56 receive one of the edges 54 of the sliding panel 40 for guiding the sliding panel 40 during movement between the open and closed positions. Hence, the sliding panel 40 moves up and down relative to the first and second vertical tracks 46, 48 and the rail 60. The rail 60 defines a generally u-shaped configuration. It is to be appreciated that the rail 60 can be any other suitable configuration or orientation.

The rail 60 is typically formed of a metal material. More typically, the metal material is steel. In certain embodiments, the metal material is an alloy. Suitable alloys include aluminum and/or iron alloys. It is to be appreciated that the rail 60 can be formed of polymeric material(s), such as plastic material(s), and/or any other suitable material(s).

The vertical sliding window assembly 20 further includes a plurality of vertical seals 62 disposed along the vertical tracks 46, 48. The vertical seals 62 seal the edge 54 of the sliding panel 40 to prevent water and other environmental elements from entering the passenger compartment. The vertical seals 62 can be any suitable seal, such as single and multi-finger seals and brush seals.

Figure 2:
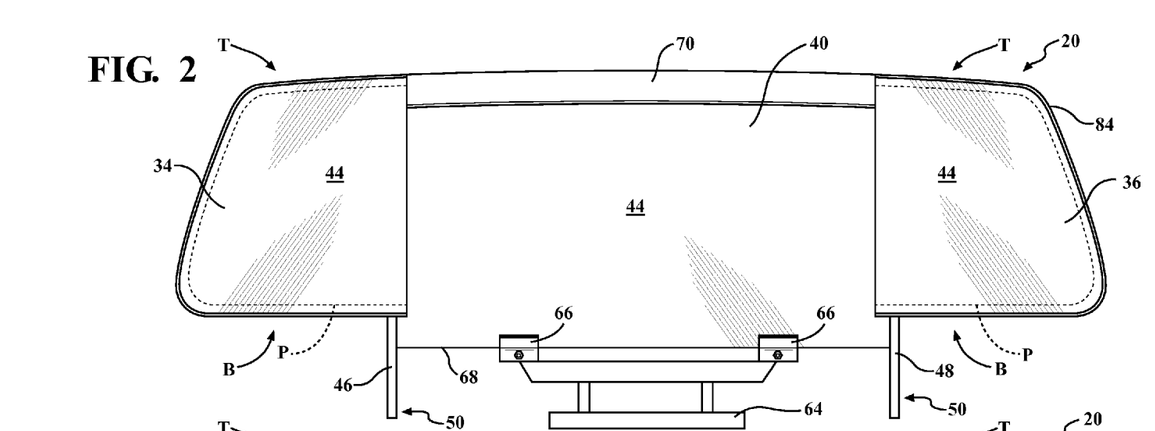
FIG. 2 is a plan view of an exterior of the vertical sliding window assembly.
Figure 3:
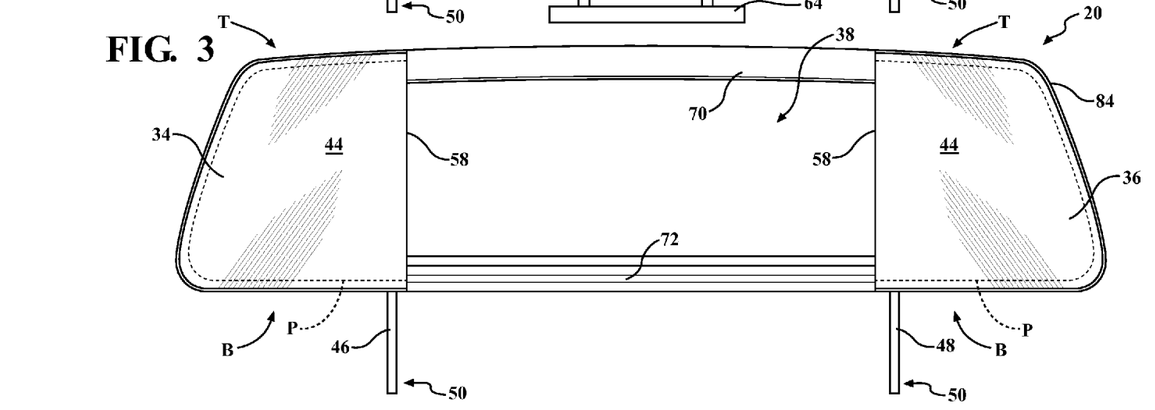
FIG. 3 is a plan view of the exterior of the vertical sliding window assembly with a sliding panel removed.

The vertical sliding window assembly 20 may include a lift assembly 64 to move the sliding panel 40 between the open and closed position. The lift assembly 64 is schematically shown in FIG. 2. The lift assembly 64 may be a manual lift assembly or, alternatively, the lift assembly 64 may be a powered lift assembly. The lift assembly 64 may include an actuator, a motor, a plurality of regulator vertical tracks 46, 48, a plurality of cables, and/or any other suitable components for moving the sliding panel 40 between the open and closed positions.

The vertical sliding window assembly 20 may further include a plurality of clamps 66 coupled to the bottom edge 68 of the sliding panel 40. More specifically, one of the clamps 66 is disposed adjacent one side edge 54 of the sliding panel 40 and another one of the clamps 66 is disposed adjacent the other side edge 54 of the sliding panel 40. The clamps 66 are generally concealed when the sliding panel 40 is in the closed and/or the closed positions. It is to be appreciated that the clamps 66 can be any suitable configuration or location. It is to further be appreciated that the clamps 66 can be coupled to the sliding panel 40 after mounting the vertical sliding window assembly 20 to the vehicle 22 or at any other suitable assembly time. It is to be appreciated that optionally, an insert can be disposed between the sliding panel 40 and the clamps 66.

With reference to FIGS. 2-5, the vertical sliding window assembly 20 includes a top cross-member 70 coupled to the first and second fixed panels 34, 36 proximate the top edge T of the first and second fixed panels 34, 36. A bottom cross-member 72 is coupled to the first and second fixed panels 34, 36 proximate the bottom edge B of the first and second fixed panels 34, 36. The bottom cross-member 72 is spaced from the top cross-member 70. The top and bottom cross-members 70, 72 span the opening 38 for interconnecting the first and second fixed panels 34, 36 together. The cross-members 70, 72 are typically traverse to the vertical tracks 46, 48 with the vertical tracks 46, 48 extending between the top and bottom cross-members 70, 72. More specifically, the top cross-member 70 is proximate to the top edge T of the fixed panels 34, 36 assembly and the bottom cross-member 72 is proximate the bottom edge B of the fixed panels 34, 36. It is to be appreciated that the terms "top" and "bottom" are used to reference an orientation of the vertical sliding window assembly 20 once the vertical sliding window assembly 20 has been installed on the vehicle 22. It is to be appreciated that when the vertical tracks are present, the bottom end 50 of the first and second vertical tracks 46, 48 may be coupled to the bottom cross-member 72 and the top end 52 of the first and second vertical tracks 46, 48 may be coupled to the top cross-member 70.

As introduced above, the cross-members 70, 72 are coupled to the first and second fixed panels 34, 36. The cross-members 70, 72 are typically coupled to the fixed panels 34, 36 by any suitable method, such as, glass encapsulation as described below, molding, bonding, etc. Generally, the cross-members 70, 72 couple the fixed panels 34, 36 together for providing structural support to the vertical sliding window assembly 20. The cross-members 70, 72 may be coupled to the vertical tracks 46, 48. Additionally, the cross-members 70, 72 may be coupled to the interior surface 42 of the fixed panels 34, 36. Furthermore, the cross-members 70, 72 may be integral with the vertical tracks 46, 48. When the cross-members 70, 72 are integral with the vertical tracks 46, 48, the cross-members 70, 72 may comprise the encapsulant material.

With reference to FIGS. 2-7, 13, and 14, the bottom cross-member 72 is disposed adjacent the interior surface 42 of the sliding panel 40. The top cross-member 70 may be disposed adjacent the exterior surface 44 of the sliding panel 40. Said differently, the top cross-member 70 and the bottom cross-member 72 are on opposite sides of the sliding panel 40. Said yet another way, the top cross-member 70 faces the exterior surface 44 of the sliding panel 40 and the bottom cross-member 72 faces the interior surface 42 of the sliding panel 40. However, the top cross-member 70 may be adjacent the interior surface 42 of the sliding panel. Because the bottom cross-member 72 is disposed adjacent the interior surface 42 of the sliding panel 40, the exterior surface 44 of the sliding panel 40 is unobstructed by said bottom cross-member 72. Said differently, the bottom cross-member 72 does not cover-up the exterior surface 44 of the sliding panel 40.

Figure 10:
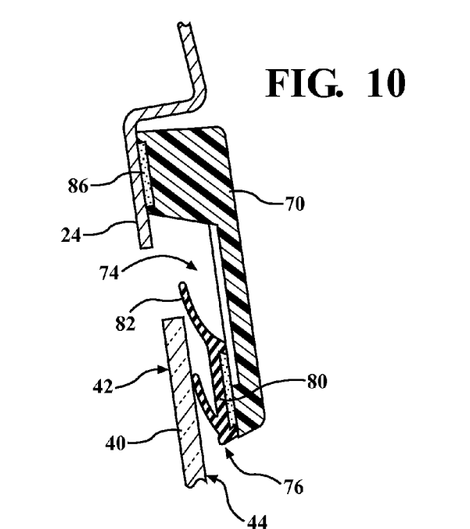
FIG. 10 is a cross-sectional view of a portion of the vertical sliding window assembly taken along line 10-10 in FIG. 6.

It is to be appreciated that the top and bottom cross-members 70, 72 can have any suitable configuration. For example, the top and bottom cross-members 70, 72 may be flat, rounded, L-shaped, and C-shaped. As shown in FIG. 10, the top cross-member 70 defines a slot 74 for receiving a top edge 54 of the sliding panel 40. It is to be appreciated that the slot 74 may be defined by the top cross-member 70 having the L-shaped configuration, as shown in FIG. 10 or that the slot 74 may be defined by the top cross-member 70 having the C-shaped configuration. The top cross-member 70 covers the top edge 54 of the sliding panel 40 when the sliding panel 40 is in the closed position and viewed from the exterior of the vehicle 22. As such, when the sliding panel 40 is recessed from the fixed panels 34, 36, the top cross-member 70 provides a show surface that extends between the fixed panels 34, 36. In such an embodiment, the show surface may be flush with an exterior surface 44 of the fixed panels 34, 36. Additionally, when the sliding panel 40 is recessed from the fixed panels 34, 36, the bottom cross-member 72 may also be recessed toward the passenger compartment of the vehicle 22 relative to the sliding panel 40.

A top seal 76 may be coupled to the top cross-member 70. The top seal 76 typically spans the sliding panel 40. However, it is to be appreciated that the top seal 76 may only be within the opening 38 between the fixed panels 34, 36. The top seal 76 engages the exterior surface 44 of the sliding panel 40 for preventing fluid, such as water, and other environmental elements from entering the passenger compartment of the vehicle 22. The top seal 76 can be of any suitable seal type, such as single or multi-fingered seals and brush seals.

Figure 11:
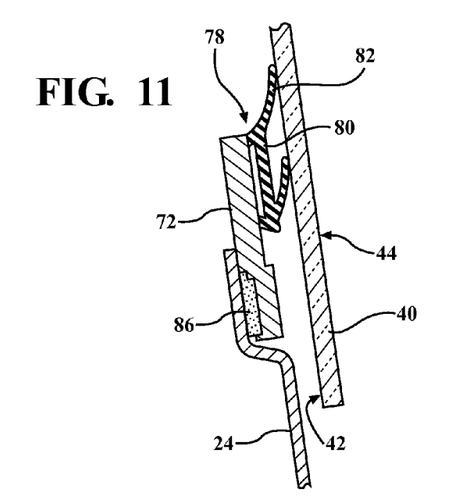
FIG. 11 is a cross-sectional view of a portion of the vertical sliding window assembly taken along line 11-11 in FIG. 6.

With reference to FIG. 11, a bottom seal 78 is coupled to the bottom cross-member 72. The bottom seal 78 typically spans the sliding panel 40. However, it is to be appreciated that the bottom seal 78 may only be within the opening 38 between the fixed panels 34, 36. The bottom seal 78 engages the interior surface 42 of the sliding panel 40 for sealing the interior surface 42 of the sliding panel 40 to prevent fluid, such as water, and other environmental elements, from entering the passenger compartment of the vehicle 22. The bottom seal 78 also supports the sliding panel 40 as the sliding panel 40 moves between the open and closed positions. The bottom seal 78 can be of any suitable seal type, such as single or multi-fingered seals and brush seals.

As introduced above, the top and bottom seals 76, 78 are disposed between the first and second vertical tracks 46, 48 and cooperate with the sliding panel 40 within the opening 38 for preventing fluid from entering into the interior of the vehicle 22. The top seal 76 faces the exterior surface 44 of the sliding panel 40. As such, the top seal 76 is adjacent the exterior of the vehicle 22. The bottom seal 78 faces the interior surface 42 of the sliding panel 40. As such, the bottom seal 78 is adjacent the interior surface 42 of the sliding panel 40. Generally, the top seal 76 only contacts that sliding panel 40 when the sliding panel 40 is in the closed position. The bottom seal 78 contacts the sliding panel 40 when the sliding panel 40 is in either the open or closed positions.

With reference to FIGS. 10 and 11, the top and bottom seals 76, 78 each include a body portion 80 having at least one lip 82 extending therefrom. In certain embodiments, the lip 82 is further defined as a plurality of lips spaced from each other. The lips 82 of the top and bottom seals 76, 78 face the exterior surface 44 of the sliding panel 40. The lips 82 of the top and bottom seals 76, 78 engage the sliding panel 40.

With reference to FIGS. 1-4, the vertical sliding window assembly 20 may include a frame 84 coupled to the first and second fixed panels 34, 36. Generally, the frame 84 is disposed about the periphery P of the first and second fixed panels 34, 36. Typically, the frame 84 wraps around an outer edge of the fixed panels 34, 36 such that the frame 84 is disposed on both the interior and exterior surfaces 42, 44 of the fixed panels 34, 36. In certain embodiments, the frame 84 also extends between the first and second fixed panels 34, 36 about the opening 38. Said differently, the frame 84 may span the opening 38 between the first and second fixed panels 34, 36. The frame 84 provides structural support and rigidity to the vertical sliding window assembly 20 by coupling the fixed panels 34, 36 together.

Generally, the vertical tracks 46, 48 are disposed between the frame 84. It is to be appreciated that the frame 84 may be integral with the vertical tracks 46, 48. The frame 84, when present, is disposed adjacent the cross-members 70, 72. Generally, the frame 84 occupies the space between the cross-members 70, 72 and the periphery P of the fixed panels 34, 36. The frame 84 may be integral with the cross-members 70, 72. The frame 84 is typically coupled to the fixed panels 34, 36 by any suitable method, such as, glass encapsulation as described below, molding, bonding, etc.

With reference to FIGS. 6-9, the vertical sliding window assembly 20 is adapted to be coupled to the vehicle 22. More specifically, the fixed panels 34, 36 are adapted to be attached to a flange 24 of the vehicle 22. The flange 24 is generally L-shaped, as best shown in FIGS. 10 and 11, such that the vertical sliding window assembly 20 is flush with the exterior of the vehicle 22 when the vertical sliding window assembly 20 is installed on the vehicle 22. However, when the sliding panel 40 is recessed relative to the fixed panels 34, 36, a modified flange 24 is used to support the fixed panels 34, 36. More specifically, when the sliding panel 40 is recessed, the modified flange 24 is stepped relative to the flange 24 at the sliding panel 40 such that the modified flange 24 extends toward the exterior of the vehicle 22 relative to the flange 24 at the sliding panel 40, as best shown in FIG. 8.

As best shown in FIGS. 10 and 11, an adhesive mechanism 86 is utilized to mount or bond the vertical sliding window assembly 20 to the vehicle 22. Generally, the adhesive mechanism 86 is disposed about a periphery P of the fixed panels 34, 36 for bonding the fixed panels 34, 36 and, therefore the vertical sliding window assembly 20, to the flange 24 of the vehicle 22. Mounting the vertical sliding window assembly 20 to the flange 24 covers the rear opening 38 of the vehicle 22. When the frame 84 is present, the frame 84 may have a mounting surface for receiving the adhesive mechanism 86 and the frame 84 is adhered or bonded to the flange 24 of the vehicle 22 through the mounting surface. In certain embodiments, the frame 84 defines a recess facing the flange 24 for receiving the adhesive mechanism 86. The recess can extend completely around the periphery P of the frame 84 or can be at any suitable location around the frame 84.

Typically, the adhesive mechanism 86 is an adhesive bead. Typically, the adhesive bead comprises urethane. For example, the adhesive bead may be a urethane adhesive. It is to be appreciated that any suitable adhesive mechanism 86 can be utilized to mount or bond the frame 84 to the flange 24 of the vehicle 22. It is to further be appreciated that a primer can be applied to the frame 84 before applying the adhesive for improving a bond strength of the adhesive with the vertical sliding window assembly 20 and/or the flange 24 of the vehicle 22.

As introduced above, the sliding panel 40 is movable between an open position and a closed position. With reference to FIGS. 13 and 14, as the sliding panel 40 moves from the closed position to the open position, the sliding panel 40 is disposed adjacent the outer surface 30 of the first wall 26. Said differently, the sliding panel 40 moves along the outer surface 30 of the first wall 26 as the sliding panel 40 moves toward the open position. The vehicle 22 may include a second wall 88 spaced from the outer surface 30 of the first wall 26. As such, the first wall 26 and the second wall 88 define a gap 90. The sliding panel 40 is movable within the gap 90 as the sliding panel 40 moves between the open and closed positions.

With reference to FIGS. 1, 13, and 14, the vehicle 22 may have a cab portion 92 defining the passenger compartment and a bed portion 94 defining a storage compartment. The first wall 26 is part of the cab portion 92 and the second wall 88 is part of the bed portion 94. Therefore, at least a portion of the sliding panel 40 is disposed between the cab portion 92 and the bed portion 94.

Figure 12:
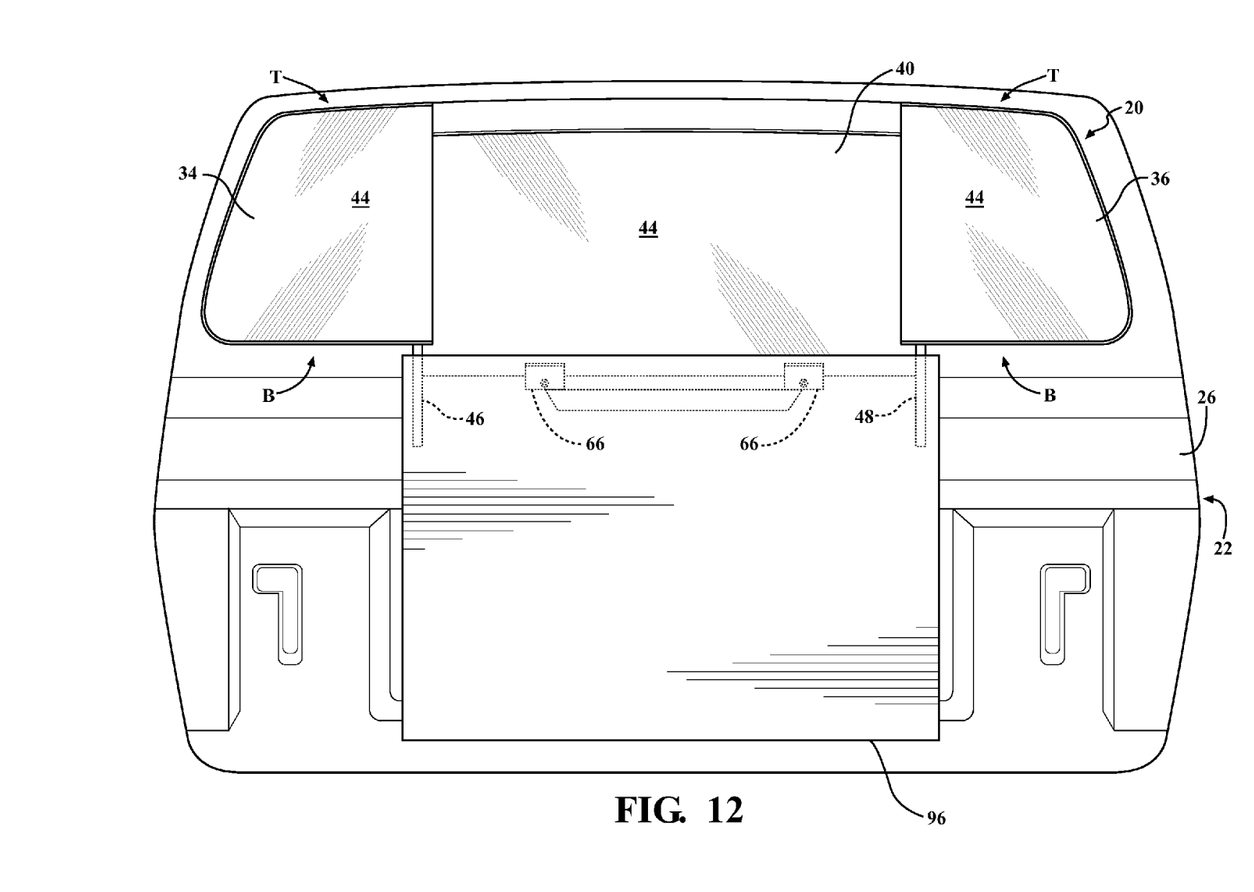
FIG. 12 is a front view of the vertical sliding window assembly coupled to the vehicle as viewed from the exterior of the vehicle showing a casing attached to the vehicle.

With reference to FIGS. 12 and 13, the vehicle 22 may include a casing 96 coupled to the first wall 26 of the vehicle 22 adjacent the vertical sliding window assembly 20. When the second wall 88 is present, the casing 96 is disposed between the first and second wall 88s. The casing 96 defines a pocket 98 for receiving the sliding panel 40 and the lift assembly 64. Said differently, the casing 96 houses the sliding panel 40 and the lift assembly 64 such that the sliding panel 40 enters the pocket 98 defined by the casing 96 as the sliding panel 40 moves from the closed position to the open position. As such, the casing 96 defines a pass-through opening 100 for receiving the sliding panel 40 as the sliding panel 40 moves toward the closed position. The vertical tracks 46, 48 extend from the fixed panels 34, 36 into the pocket 98 for guiding the sliding panel 40 into the pocket 98 when the sliding panel 40 is moving toward the open position. It is to be appreciated that a portion of the sliding panel 40 typically remains within the pocket 98 to hide a connection point where the sliding panel 40 is coupled to the lift assembly 64.

The casing 96 acts as a shroud to protect the sliding panel 40 and the lift assembly 64. As such, the casing 96 typically comprises the same rigid material as the body of the vehicle 22, such as sheet metal. However, it is to be appreciated that the casing 96 can be formed from any suitable material, such as plastic. Additionally, the casing 96 can have any suitable cross-sectional configuration, such as rectangular, trapezoidal, or arcuate for increasing a strength of the casing 96. Additionally, the casing 96 can be formed by any suitable process, such as stamping and molding. The casing 96 may be painted. For example, the casing 96 may be panted a similar color as the vehicle 22. Furthermore, it is to be appreciated that limits of casing 96 shown in FIG. 12 are only intended to be illustrative. The casing 96 may extend farther up relative to the fixed panels 34, 36. The casing 96 may also be wider depending on a width of the sliding panel 40. The casing 96 may also be taller or wider to accommodate the lift assembly 64. The casing 96 may be visible from the exterior of the vehicle 22. Alternatively, depending on the vehicle 22, the casing 96 may be hidden from view.

It is to be appreciated that the pocket 98 may be defined by the first wall 26 of the passenger compartment in combination with the casing 96, as shown in FIG. 14. For example, the casing 96 may be coupled to the first wall 26 outside of the passenger compartment with the pocket 98 defined between the first wall 26 and the casing 96. Alternatively, the casing 96 may define the pocket 98 entirely by itself, as shown in FIG. 13.

The casing 96 may include a casing seal 102 at the opening 38 of the casing 96 for contacting and sealing the exterior surface 44 of the sliding panel 40 to prevent water, and other environmental elements, from entering the pocket 98 of the casing 96. The casing seal 102 also supports the sliding panel 40 in combination with the bottom seal 78 on the bottom cross-member 72 as the sliding panel 40 moves between the open and closed positions. The casing seal 102 can be of any suitable seal type, such as single or multi-fingered seals and brush seals. Additionally, the casing 96 may include at least one drain hole for allowing water, and other environmental elements, that may enter the pocket 98 to exit the pocket 98.

With reference to FIGS. 13 and 14, when the vehicle 22 is a truck, the casing 96 is located between the first wall 26 of the cab portion 92 and the second wall 88 of the bed portion 94 of the truck. Said differently, the casing 96 protrudes externally away from the cab portion 92 toward the bed portion 94 of the truck rather than protruding into the passenger compartment of the cab portion 92. Therefore, because the casing 96 is external to the passenger compartment, the sliding panel 40 does not require or occupy space within the passenger compartment. The casing 96 also houses the lift assembly 64 thereby removing the lift assembly 64 from the passenger compartment of the vehicle 22, which also saves space within the passenger compartment.

The first wall 26 of the passenger compartment may include an access hole for allowing access into the pocket 98 to service and/or replace the lift assembly 64 and/or components of the lift assembly 64. When the vehicle 22 is a truck, the bed of the truck may be removed or shifted to allow access into the pocket 98.

The top and bottom cross-members 70, 72 and, if present, the vertical tracks 46, 48 and the frame 84, may be coupled to the fixed panels 34, 36 by any suitable method. An example of a suitable method is adhesive surface bonding. Although not required, adhesive surface bonding can be a process referred to in industry as glass encapsulation. Glass encapsulation can be further defined as single-sided encapsulation, two-sided encapsulation, or three-sided encapsulation. In glass encapsulation, an encapsulant material is applied to and formed in the presence of glass. When utilizing glass encapsulation, the encapsulant material is typically a plastic material(s) and more typically, thermoplastic material(s) and/or themoset material(s). Even more typically, the plastic material is polyvinyl chloride (PVC). It is to be appreciated that the encapsulant material can comprise various plastic material(s); various different types of reaction injection molding (RIM) materials; and/or any other suitable material(s) for encapsulation.

When glass encapsulation is used to form the vertical tracks 46, 48 the encapsulant material forms at least a portion of each of the vertical tracks 46, 48 and bonds to the fixed panels 34, 36 to connect the vertical tracks 46, 48 to the fixed panels 34, 36. For example, with reference to FIG. 15, when glass encapsulation is used, the vertical tracks 46, 48 include an elongated member formed from the encapsulant material. The elongated member is bonded directly to the fixed panels 34, 36. In such an embodiment, the track may also include a rail 60 embedding within the elongated member to provide structural support for the vertical tracks 46, 48. Said differently, the rail 60 is rigid relative to the elongated member for reinforcing the elongated member. The rail 60 is typically formed of metal, such as aluminum; however, it is to be appreciated that the rail 60 may be formed of any suitable material. When glass encapsulation is used, either the rail 60 or the elongated member defines the guide channel 56 of the track.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vertical sliding window assembly for coupling to a vehicle, said vertical sliding window assembly comprising:
   a first fixed panel adapted to be fixed to the vehicle and having a top edge and a bottom edge spaced from each other;
   a second fixed panel adapted to be fixed to the vehicle and spaced from said first fixed panel to define an opening therebetween with said second fixed panel having a top edge and a bottom edge spaced from each other;
   a top cross-member coupled to said first and second fixed panels proximate said top edge of said first and second fixed panels with said top cross-member spanning said opening;
   a bottom cross-member spaced from said top cross-member and bonded to said first and second fixed panels proximate said bottom of said first and second fixed panels with said bottom edge cross-member spanning said opening; and
   a sliding panel having an interior surface and an exterior surface opposite said interior surface with said sliding panel movable relative to said fixed panels between a closed position and an open position such that a size of said opening can be modified;

wherein said bottom cross-member is disposed adjacent said interior surface of said sliding panel such that said exterior surface of said sliding panel is unobstructed by said bottom cross-member.

2. A vertical sliding window assembly as set for in claim 1 wherein said top cross-member is disposed adjacent said exterior surface of said sliding panel.

3. A vertical sliding window assembly as set forth in claim 1 further comprising a bottom seal coupled to said bottom cross-member and a top seal coupled to said top cross-member with said bottom seal engaging said interior surface of said sliding panel and said top seal engaging said exterior surface of said sliding panel for preventing fluid from entering into the vehicle.

4. A vertical sliding window assembly as set forth in claim 1 further comprising:
  a first vertical track coupled to and extending between said top and bottom cross-members with said first vertical track having a bottom end adjacent said bottom edge of said first fixed panel and a top end adjacent said top edge of said first fixed panel; and
  a second vertical track spaced from said first vertical track with said second vertical track coupled to and extending between said top and bottom cross-members with said second vertical track having a bottom end adjacent said bottom edge of said second fixed panel and a top end adjacent said top edge of said second fixed panel.

5. A vertical sliding window assembly as set forth in claim 4 further comprising a frame coupled to said first and second fixed panels and spanning said opening between said fixed panels.

6. A vertical sliding window assembly as set forth in claim 5 wherein said frame is disposed about a periphery of said fixed panels.

7. A vertical sliding window assembly as set forth in claim 6 wherein said first and second vertical tracks are disposed between said frame.

8. A vertical sliding window assembly as set forth in claim 7 wherein said frame has a mounting surface for receiving an adhesive mechanism to couple said frame to the vehicle.

9. A vertical sliding window assembly as set forth in claim 7 wherein said bottom end of said first and second vertical tracks is coupled to said bottom cross-member and said top end of said first and second vertical tracks is coupled to said top cross-member.

10. A vertical sliding window assembly as set forth in claim 4 wherein said bottom cross-member is integral with said first and second track.

* * * * *